United States Patent [19]

Worley

[11] 4,204,713

[45] May 27, 1980

[54] MEANS FOR ATTACHING A COVER TO A BICYCLE SADDLE

[75] Inventor: George W. Worley, Bolivar, Tenn.

[73] Assignee: Troxel Manufacturing Company, Moscow, Tenn.

[21] Appl. No.: 3,488

[22] Filed: Jan. 12, 1979

[51] Int. Cl.² ............................................. B62J 1/18
[52] U.S. Cl. ...................................... 297/214; 5/403; 297/218
[58] Field of Search ............... 297/195, 214, 217, 218; 5/403

[56] References Cited

U.S. PATENT DOCUMENTS

| | | | |
|---|---|---|---|
| 1,342,522 | 6/1920 | Young | 5/403 X |
| 3,131,969 | 5/1964 | Kalter | 297/214 |
| 3,756,653 | 9/1973 | Worley | 297/214 |
| 3,981,534 | 9/1976 | Wilton | 297/219 |
| 4,026,600 | 5/1977 | Kutaguchi | 297/214 |
| 4,103,966 | 8/1978 | Allen | 297/214 X |

FOREIGN PATENT DOCUMENTS

| | | | |
|---|---|---|---|
| 1088061 | 3/1955 | France | 297/214 |
| 476315 | 12/1952 | Italy | 297/214 |
| 593041 | 1/1976 | Switzerland | 297/219 |

*Primary Examiner*—Roy D. Frazier
*Assistant Examiner*—Peter A. Aschenbrenner
*Attorney, Agent, or Firm*—John R. Walker, III

[57] ABSTRACT

Apparatus for attaching a molded bicycle saddle cover to its companion base member. The attaching apparatus includes at least one prong member fixedly attached to the base member at a predetermined spaced distance inwardly of a downwardly extending flange which is integrally provided along the entire periphery of the base member. The prong structure cooperates with the flange in defining a narrow channel which snugly receives a folded flap portion that is integrally provided along the entire periphery of the cover, i.e., the folded flap portion contiguously engages the flange. The cover is formed from a substance wherein the flap portion is somewhat inherently resilient in nature while the thickness of the flap portion is sufficient so as to impart a degree of yieldable stiffness thereto, thus contributing significantly to the effectiveness of the attachment apparatus.

8 Claims, 5 Drawing Figures

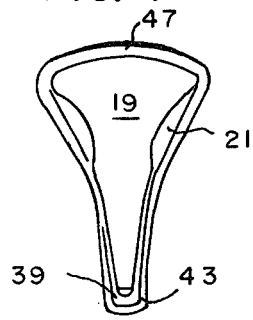
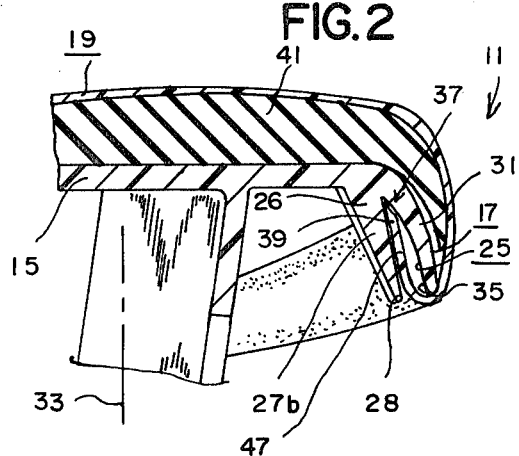
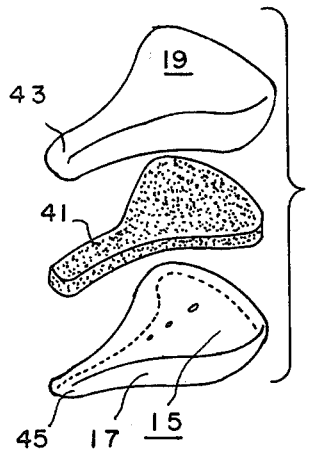
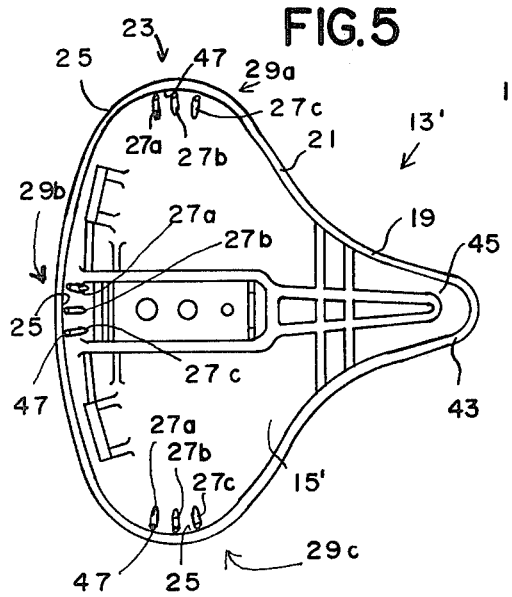
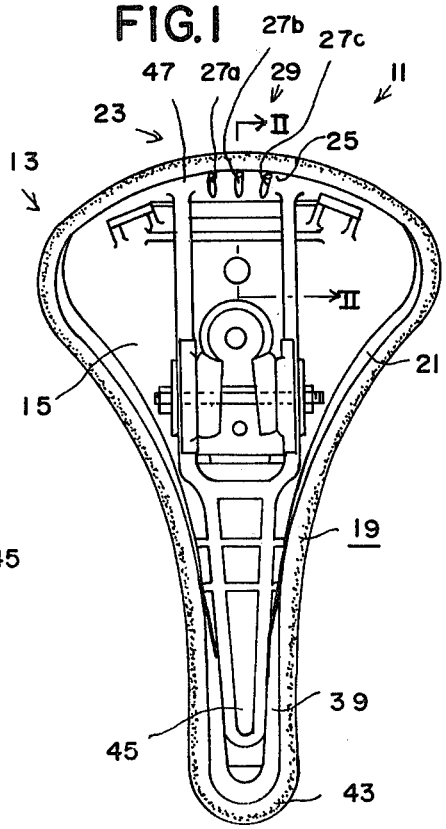

MEANS FOR ATTACHING A COVER TO A BICYCLE SADDLE

BACKGROUND OF THE INVENTION

1. Field of the Invention

This invention relates to the field of bicycle saddles.

2. Description of the Prior Art

In the past, it has been a practice to use rivets in attaching a cover member to its companion base structure. However, with the ever increasing labor costs and the importance of holding down the cost of a bicycle, it has become necessary to develop new techniques in the construction of bicycles, particularly in the art of manufacturing bicycle saddles. The current state of the art for bicycle saddles includes making these saddles entirely from plastic. This technique, of course, embraces new engineering philosophies and new problems keep surfacing as the state of the art progresses.

Applicant is aware of a U.S. Pat. No. 4,026,600, granted to Kutaguchi on May 31, 1977. It should be understood that applicant's device is not suggested or disclosed by the above mentioned Kutaguchi patent.

SUMMARY OF THE INVENTION

The present invention is directed towards overcoming the problems and disadvantages of the previous bicycle saddles, particularly the manner in which the saddle cover is attached to its companion base. Hence, this invention embraces apparatus for attaching a molded bicycle saddle cover to its companion base member. The attaching apparatus of this invention includes at least one prong member affixed to the base member at a predetermined spaced distance inwardly of a downwardly extending flange which is integrally provided along the entire periphery of the base member. The prong structure cooperates with the flange in defining a narrow channel which snugly receives an inwardly directed folded flap portion that is integrally provided along the entire periphery of the cover, i.e., the folded flap portion contiguously engages the flange. The integrally formed cover is formed from a substance wherein the flap portion thereof is somewhat inherently resilient in nature while the thickness of the flap portion is sufficient so as to impart a degree of yieldable stiffness thereto, thus contributing significantly to the overall effectiveness of the attachment apparatus.

For a better or more complete understanding of this invention, one embodiment thereof will be fully described by making explicit reference to the accompanying drawings, in which the various parts are indicated by numerals.

DESCRIPTION OF THE DRAWINGS

FIG. 1 is a bottom plan view of a complete bicycle saddle showing one embodiment of the present invention incorporated therewith.

FIG. 2 is an enlarged partial sectional view taken as on line II—II of FIG. 1.

FIG. 3 is an exploded view showing the three major components comprising the present invention, viz., the cover, the pad, and the base.

FIG. 4 is a bottom plan view of merely the cover component as shown in FIG. 3.

FIG. 5 is a bottom plan view of a different style saddle than that shown in FIG. 1 and which incorporates a different arrangement of the attachment means of the present invention.

DESCRIPTION OF THE PREFERRED EMBODIMENT

The attachment means 11 of the present invention is intended to be used in combination with a plastic bicycle saddle, as at 13, of the type wherein a saddle base, as at 15, is included which has a downwardly extending flange, as at 17, provided along the entire periphery thereof; and a saddle cover, as at 19, is included which is furnished with inwardly directed flap means, as at 21, along the entire periphery thereof for being folded over the flange 17 thus contiguously engaging the flange 17. The attachment means 11 is for removably attaching the cover 19 to the saddle base 15 and in a manner to be fully described. The attachment means 11 includes prong means, generally indicated at 23, and which is/are fixedly attached to the saddle base 15 and being disposed thereon at a predetermined spaced distance inwardly of the flange 17 for cooperating therewith in defining a narrow channel, as at 25, into which the flap means 21 is snugly received. The saddle cover 19 is molded from a substance having characteristics wherein the flap means 21 remains somewhat inherently resilient and flexible while the thickness of at least the flap means 21 is sufficient so as to impart a degree of yieldable stiffness thereto, thus contributing significantly to the effectiveness of the attachment means 11. For example, the cover 19 may be formed from a suitable plastic, e.g., vinyl, and the like wherein a suitable thickness of the flap means 21 may be approximately a nominal $\frac{1}{8}$ inch or 3.175 milimeters.

It should be understood that the term prong means 23 as used herein may encompass many forms and arrangements among which is included at least one grouping of a plurality of prong members 27 which are individually designated as 27a, 27b, 27c, etc. In this event, the prong members 27 are disposed in close linear proximity one with the other whereby a cooperative line of the prong members 27 and the flange 17 jointly define the channel 25 for snugly receiving the flap means 21.

Moreover, the term prong means is intended to include merely one prong member 27, if desired. That is, the prong members 27a and 27c, as shown in FIG. 1 of the drawing, may be deleted without departing from the spirit and scope of the present invention. The preferred arrangement of the single prong member 27b would be to position it along the fore to aft centerline of the saddle 13, as clearly indicated in FIG. 2 of the drawing.

Also, each prong member 27 may be tapered, if desired, from a broad base portion 26 toward a more narrow terminal position 28, as clearly shown in FIG. 2 of the drawing.

In addition, the term prong means 23 may include merely a single grouping, as at 29, of prong members 27, as shown in FIG. 1 of the drawings. In this event, the prong members 27 are disposed in close linear proximity one with the other with the group 29 being centrally disposed along the rearwardmost portion of the saddle base so as to substantially straddle the longitudinal center line thereof.

Further, the prong means 23 may include the concept of arranging the plurality of individual prong members 27 in such a manner so as to establish a plurality of groupings thereof which are individually designated as 29a, 29b, 29c, etc., as shown in FIG. 5 of the drawings. Since the saddle depicted in FIG. 5 differs somewhat from the one shown in FIG. 1, it will be characterized by the numeral 13 having a prime suffix, thus 13'.

In this latter event, it should be understood that the individual prong members 27a, 27b, 27c, 27c, etc., which jointly establish each of the several groupings 29a, 29b, 29c, etc., are likewise disposed in close linear proximity one with the other, i.e., in each of the groups 29. Moreover, it may readily be seen from FIG. 5 of the drawing that the several groups 29a, 29b, 29c, etc., are strategically spaced around the periphery of the saddle base thereof. Since the saddle base for the saddle depicted in FIG. 5 differs somewhat from the saddle base depicted in FIG. 1, the saddle base in FIG. 5 will be characterized by the numeral 15 having a prime suffix, thus 15'.

Here again, it may be desirable to limit the prong means 23 to merely one prong member 27 in each of the several strategic locations. Therefore, it should be understood that the prong members 27a and 27c, as shown in FIG. 5 of the drawing, may be deleted from each grouping thereof, without departing from the spirit and scope of the present invention. The arrangements of the several singularly disposed prong members 27 are intended to be peculiar with the particular style saddle, or they are strategically spaced about the periphery of the saddle base thereof.

The attachment means 11 of the present invention may further be characterized by angularly displacing at least a portion of the saddle base 17, as at 31, in a rearward direction away from a true vertically disposed plane, as at 33, with the prong means 23 being constructed and arranged with respect to the portion 31 so as to jointly provide a cuneated shape to the narrow channel 25, as clearly shown in FIG. 2 of the drawing.

In addition, the cuneated channel 25 has a downwardly directed broad opening portion, as at 35, for facilitating the initial engagement of the flap means 21. Furthermore, the cuneated channel 25 has an apex portion, as at 37, for ultimately receiving the flap means 21 as the attachment means 11 become fully implemented.

Indeed, it may clearly be seen from FIG. 2 of the drawings that the depth of the cuneated channel 25 is precisely equal to the dimension of the folded over portion, as at 39, of the flap means 21 for providing or facilitating optimum engagement of the attachment means 11.

It will be appreciated by those skilled in the art that the attachment means 11 is further facilitated in the implementation thereof by the incorporation of a typical resilient pad member, as at 41, and as clearly shown in FIGS. 2, 3 of the drawings. Moreover, the resilient nature of the pad member 41 is effective in aiding in the initial engagement of the attachment means 11, i.e., compressing the pad member 41 while simultaneously threading the flap means 21 into the narrow channel 25.

In this regard, it will be appreciated by those skilled in the art that the preferred sequence in installing the cover 19 upon the base 15 is as follows: the pad member 41 is first inserted into the cover 19. Thence, the nose, as at 43, of the cover 19 is fitted over the forward portion, as at 45, of the base 15. Thence, the flap means 21 may now be progressively folded over the flange 17 so as to eventually contiguously engage the flange 17. Thence, the portion, as at 47, which engages the prong means 23 is simply rolled into the cuneated channel 25 while simultaneously compressing the resilient pad member 41. In this manner, the portion 47 of the flap means 21 is ultimately received in the apex portion 37 of the cuneated channel 25 as the attachment means 11 become fully implemented.

Since the remaining structure of the base 15 is well known to those skilled in the art, no attempt will herein be made to further describe the base 15.

While the present invention has been described and illustrated with respect to a preferred embodiment thereof, it is to be understood that it is not intended to be so limited since changes and modifications may be made therein which are within the full intended scope of the invention.

I claim:

1. In combination with a plastic bicycle saddle of the type wherein a saddle base having a downwardly extending flange along the entire periphery thereof is provided, and a saddle cover furnished with inwardly directed flap means along the entire periphery thereof for being folded over the flange of said base thus contiguously engaging the flange of said base, the improvement which comprises attachment means for removably attaching said cover to said saddle base, said attachment means comprising prong means fixedly attached to said saddle base being disposed a predetermined spaced distance inwardly of said flange for cooperating therewith in defining a narrow channel into which said flap means is snugly received, said saddle cover being molded from a substance having characteristics wherein said flap means remains somewhat inherently resilient and flexible while the thickness of at least said flap means is sufficient so as to impart a degree of yieldable stiffness thereto, thus contributing significantly to the effectiveness of said attachment means.

2. The combination as set forth in claim 1 which said prong means includes at least one grouping of a plurality of individual prong members disposed in close linear proximity one with the other whereby a cooperative line of said prong members and the flange of said saddle base jointly define said channel for snugly receiving said flap means.

3. The combination as set forth in claim 1 in which said prong means includes a plurality of individual prong members arranged so as to establish a plurality of groupings thereof.

4. The combination as set forth in claim 1 in which at least a portion of said saddle base is angularly displaced in a rearward direction away from a true vertically disposed plane with said prong means being constructed and arranged with respect thereto so as to jointly provide a cuneated shape to said narrow channel, the cuneated channel having a downwardly directed broad opening portion for facilitating the initial engagement of said flap means, and said cuneated channel having an apex portion for ultimately receiving said flap means as said attachment means become fully implemented.

5. The combination as set forth in claim 4 in which the depth of said cuneated channel is precisely equal to the dimension of the folded over portion of said flap means for providing optimum engagement of said attachment means.

6. The combination as set forth in claim 1 in which said prong means includes merely a single group of a plurality of individual prong members disposed in close linear proximity one with the other, said single group of prong members being centrally disposed along the rearwardmost portion of the saddle base so as to substantially straddle the longitudinal centerline thereof.

7. The combination as set forth in claim 1 in which said prong means includes several groups of individual prong members which are disposed in close linear proximity one with the other in each of said several groups, said several group of prong members being strategically spaced around the periphery of said saddle base.

8. The combination as set forth in claim 1 in which said prong means consists of a single prong member which is tapered from a broad base portion toward a more narrow terminal portion.

* * * * *